US005696613A

United States Patent [19]
Redfield et al.

[11] Patent Number: 5,696,613
[45] Date of Patent: Dec. 9, 1997

[54] METHOD AND APPARATUS FOR MULTIPLEXING DATA IN DIFFERENT PLANES OF INCIDENCE OF A THIN HOLOGRAPHIC STORAGE MEDIA

[75] Inventors: Stephen Roger Redfield; Jahja Irwanto Trisnadi, both of Austin, Tex.

[73] Assignee: Tamarack Storage Devices, Austin, Tex.

[21] Appl. No.: 614,956

[22] Filed: Mar. 11, 1996

Related U.S. Application Data

[63] Continuation of Ser. No. 110,138, Aug. 20, 1993, abandoned.

[51] Int. Cl.⁶ .............. G03H 1/22; G03H 1/28; G03H 1/02; G02B 5/32
[52] U.S. Cl. .............. 359/32; 359/24; 359/21; 359/3; 359/10
[58] Field of Search .............. 359/24, 32, 10, 359/21, 22, 1, 3, 11; 369/103

[56] References Cited

U.S. PATENT DOCUMENTS

| | | |
|---|---|---|
| 4,034,355 | 7/1977 | Carlsen .............. 359/32 |
| 4,265,522 | 5/1981 | Matsumoto et al. .............. 359/32 |
| 4,592,618 | 6/1986 | Haignard et al. .............. 359/10 |
| 5,005,927 | 4/1991 | Cudney et al. .............. 359/7 |
| 5,121,231 | 6/1992 | Jenkins et al. .............. 359/7 |
| 5,282,067 | 1/1994 | Liu .............. 359/7 |
| 5,331,445 | 7/1994 | Dickson et al. .............. 359/24 |

*Primary Examiner*—Paul M. Dzierzynski
*Assistant Examiner*—Audrey Chang
*Attorney, Agent, or Firm*—Gregory M. Howison

[57] ABSTRACT

A holographic data storage system includes a laser (12) for generating both data and reference beams. The reference beam is deflected by an optic system such that the reference beam can be directed at the surface of a thin holographic storage media (10) to interfere with a data beam to store data in the form of an interference grating. For each Bragg angle associated with a reference beam and a data beam, multiple pages of information are stored in the storage media (10). Each page of information stored at a given Bragg angle is associated with a different Bragg plane. Upon reconstruction of the data, a given reference beam at a given Bragg angle will reconstruct the data in the associated Bragg plane on a detector (42) and will reconstruct data for the same Bragg angle but a different Bragg plane in an off-image plane (88) or (90). This, therefore, allows multiple pages of information to be stored for the same Bragg angle in the same storage region (54).

6 Claims, 5 Drawing Sheets

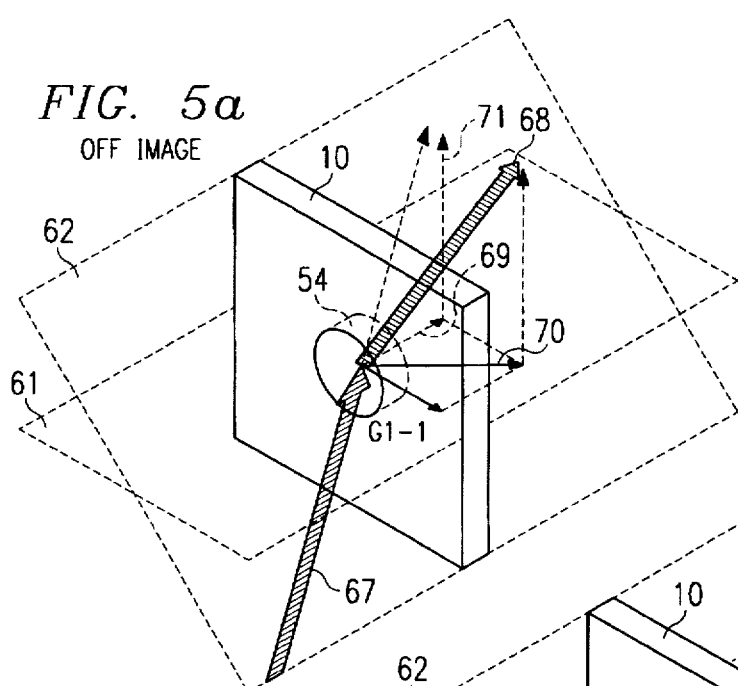
FIG. 5a OFF IMAGE
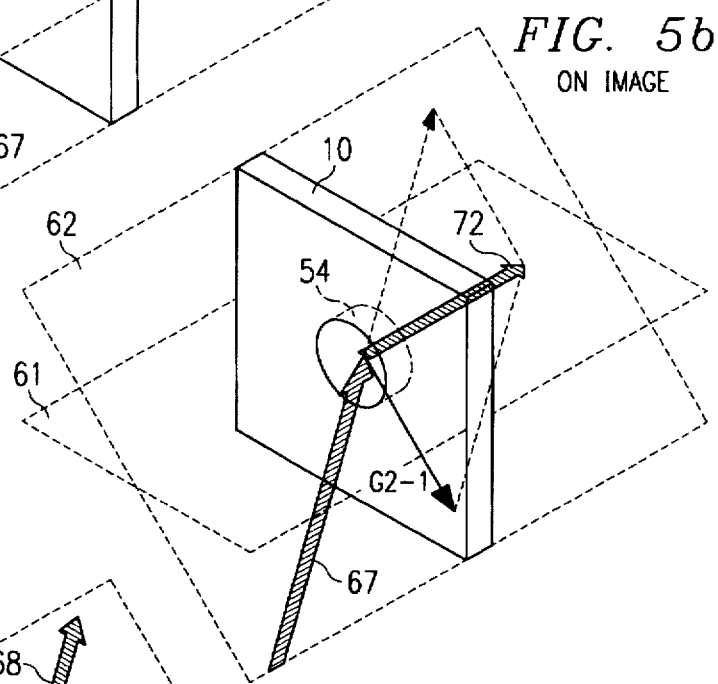
FIG. 5b ON IMAGE
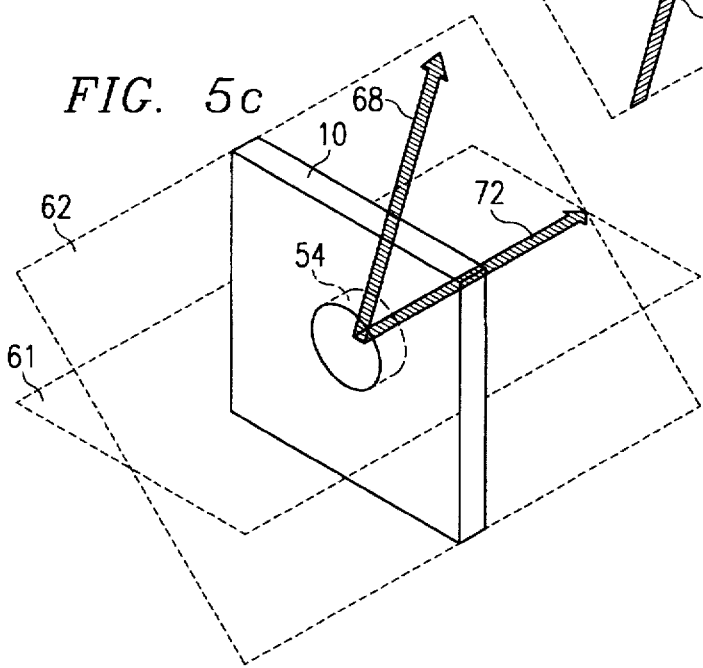
FIG. 5c
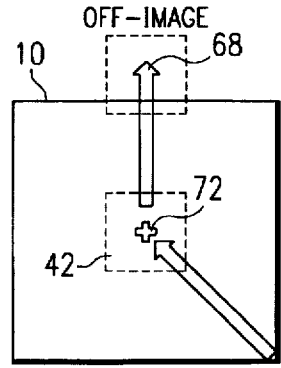
FIG. 5d OFF-IMAGE

METHOD AND APPARATUS FOR MULTIPLEXING DATA IN DIFFERENT PLANES OF INCIDENCE OF A THIN HOLOGRAPHIC STORAGE MEDIA

This application is a Continuation of application Ser. No. 08/110,138, filed Aug. 20, 1993, now abandoned.

TECHNICAL FIELD OF THE INVENTION

The present invention pertains in general to holographic memories and, more particularly, to an encoding technique for storing data in a thin holographic storage media in different Bragg planes of incidence with substantially the same angle.

CROSS REFERENCE TO RELATED APPLICATIONS

This Application is related to U.S. patent application Ser. No. 08/091,311, filed Jul. 14, 1993, and entitled "Method and Apparatus for Isolating Data Storage Regions in a Thick Holographic Storage Media", U.S. patent application Ser. No. 08/091,620, filed Jul. 14, 1993, and entitled "Method and Apparatus for Isolating Data Storage Regions in a Thin Holographic Storage Media" and U.S. Pat. application Ser. No. 08/110,139, filed Aug. 20, 1993, and entitled "Method and Apparatus for Phase Encoding Data Storage Regions in a Thin Holographic Storage Media".

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

One of the limiting aspects to the density of storage in the storage media is the number of pages that can be multiplexed or stored in a given storage area within the holographic storage media. Typically, the multiplexed pages are discriminated by varying the angle of a reference light beam relative to an object or data light beam. This is called angle multiplexing. During recording, the data within the object light beam will be captured within the storage media as the interference pattern formed between the reference light beam and the object light beam, this resulting in interference gratings being stored. Then another page is written in the same location with a different reference beam angle, this angle being separated from the previous angle by some amount. The separation required so that there is no crosstalk between multiplexed pages is a function of the thickness of the media; the thinner the media, the larger the separation. However, there is a limitation to the number of reference beam angles and the separation thereof that can be associated with a given storage media. This is especially so as the storage media goes to a thin storage media, such as that present when utilizing media such as photosensitive photopolymer materials.

All the angles associated with a set or stack of multiplexed recordings or pages are conventionally constructed such that they lie in the same plane, which is called the plane. This plane of incidence also contains the object or data beam. Any beams supplied for readout that do not lie in this plane will still reconstruct recordings according to their projection onto this plane.

SUMMARY OF THE INVENTION

The present invention disclosed and claimed herein comprises a holographic recording system. The holographic recording system includes the holographic storage media having recording regions defined therein. A recording system is provided for storing holographic recordings in select ones of the recording regions as interference gratings. Angle multiplexing is used to store a number of holographic recordings in one recording region. At least one of the storage regions has stored therein two holographic recordings which were stored utilizing substantially the same Bragg angle but in different planes of incidence. The holographic recording is extracted with a reconstruction system that is operable to distinguish between the two recordings stored in the at least one storage region with substantially the same angle.

In another aspect of the present invention, the two recordings stored in the at least one storage region having the same Bragg angle are recorded in different planes of incidence by directing two separate reference beams in the two different planes of incidence onto the surface of the storage media at different times within one of the recording regions to interfere with the data or object beam having data encoded therein. The data beam and each of the two reference beams each comprise a single plane of incidence with the angle between the data beam and the each of the reference beams comprising the Bragg angle, which Bragg angle is substantially the same. During reconstruction, the reference beam need only be directed at the same Bragg angle and in the same plane of incidence as the originally recorded holographic recording. This results in an on-image reconstructed data beam being generated in addition to an off-image reconstructed data beam for recordings at the same Bragg angle but in different planes of incidence. The system is so arranged that this off-image misses the detector array.

In a further aspect of the present invention, the recording system includes an optics system for generating a data beam having data encoded therein and a reference beam. A first directing system is operable to direct the data beam onto the surface of the storage media through one of the recording regions. A second directing system is operable to direct the reference beam at the surface of the storage media to interfere with the data beam. The second directing system is operable to direct the reference beam at a select Bragg angle relative to the data beam and in at least two planes of incidence for a given Bragg angle.

BRIEF DESCRIPTION OF THE DRAWINGS

For a more complete understanding of the present invention and the advantages thereof, reference is now made to the following description taken in conjunction with the accompanying Drawings in which:

FIGS. 5a and 5b illustrate perspective views of the reconstruction operation for the off-image and on-image;

FIGS. 5c and 5d illustrate a perspective and an end view of the reconstructed on- and off-images

DETAILED DESCRIPTION OF THE INVENTION

Figure 1A:
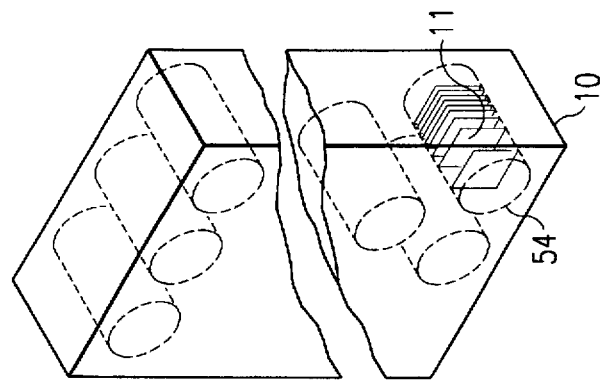
FIG. 1a illustrates a detail of the recording media.
Figure 1:
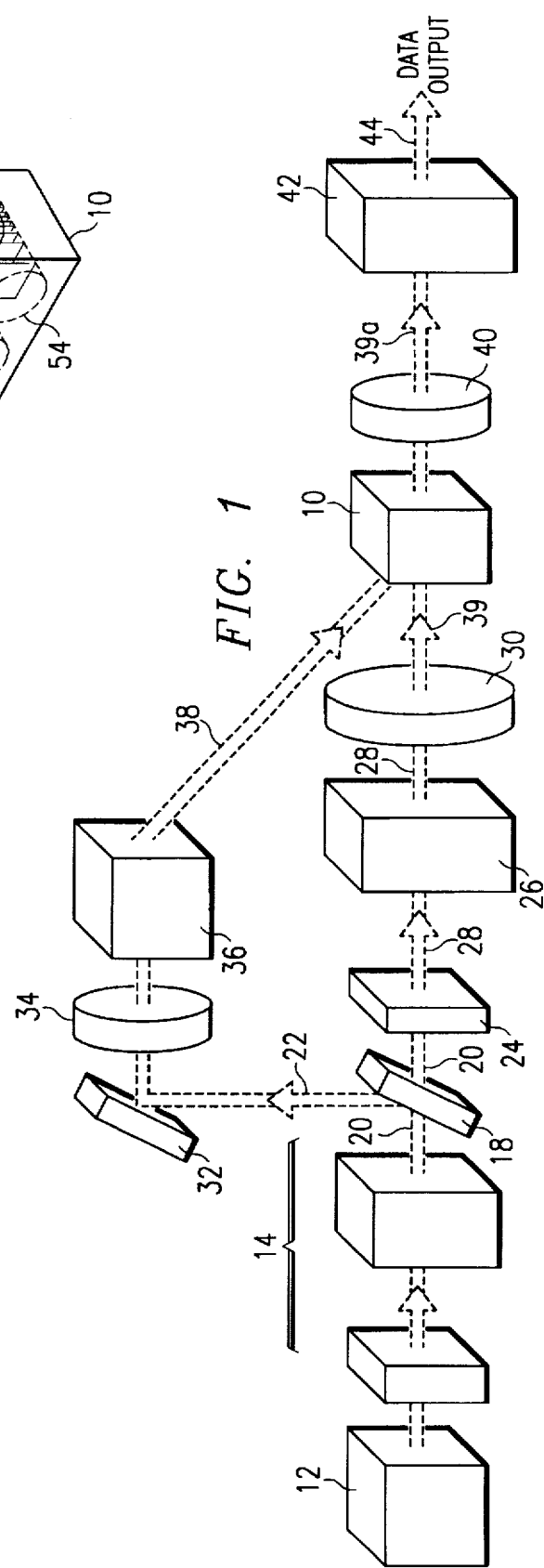
FIG. 1 illustrates an overall block diagram of a holographic storage assembly.

Referring now to FIG. 1, there is illustrated a holographic storage assembly which is operable to store data in a transparent holographic storage recording media 10 and extract that data therefrom. The data is organized in the recording media as an array of stacks of pages 11 (images). This is illustrated in FIG. 1a, wherein each of the stacks of pages 11 occupies a small region 54 of the recording media 10, with each of the pages in each of the regions 54 comprising an interference grating, all of the interference gratings in a given region 54 superimposed over each other. A laser 12 is provided, which can be comprised of, for example, a diode-pumped YAG (yttrium aluminum garnet) laser with a power output of around 80 milliwatts, with a wavelength in the range of 532 nanometers. The output beam of the laser is processed by a stack-selector assembly 14 which steers the beam to the location of an individual stack of pages 11 in the recording media 10. The output of the stack selector assembly 14 is then passed to a beam splitter 18 which separates the beam into two beams, a data beam 20 and a reference beam 22.

The data beam 20 is expanded by a beam expander 24 which is then input to a Spatial Light Modulator (SLM) 26 to output an expanded data beam 28. The SLM 26 receives data from a computer system (not shown) and then this data is superimposed on the expanded data beam 28 by the SLM 26, creating a bit pattern of light and dark spots in the conventional manner. This pattern of spots represents the bits on the page to be stored. After the SLM 26, the data beam is then passed through a focusing system 30 which then focuses the beam onto a select portion of the surface of the holographic storage media 10. This focused data beam 39 is the Fourier transform of the pattern of spots, or page.

The reference beam 22 is reflected from a mirror 32 and then passed through a polarization rotator 34, the polarization orientation dictated by an external control signal. This rotator is utilized to adjust the polarization of the reference beam 22 during a read operation. The output of the polarization rotator 34 is then input to a page addressing deflector system 36 which defines the angle at which the reference beam will impinge the surface of the recording media 10 at a select location thereon. The location is determined via an x-y motive mechanism that positions the media 10.

As the two beams, the data beam and the reference beam, enter the recording media 10, the reference beam interferes with the data beam, writing an interference grating in the storage media 10. In the case of a photorefractive material, the grating pattern results from a stored electronic-charge pattern that modifies the optical properties of the crystallite. In the case of photopolymer material, certain areas of the photopolymer material are polymerized to form the interference grating. The result is a 3-D holographic image of the Fourier transform of the bit pattern carried in the data beam. This stored interference grating allows the original data beam to be recreated when the system reads the data. This process on which the interference grating is formed on the recording media 10 is basically the Write process for a holographic storage material.

The Write process is repeated a number of times, with the angle of the reference beam operable to be changed each time, to record a plurality of interference gratings at the same location. Each of the interference gratings is associated with a different input bit pattern, which interference gratings are superimposed over each other. This collection of superimposed recordings is called a stack. The recordings that comprise each of the stacks are angularly multiplexed within each of the stacks.

During a Read cycle, the data beam is shut off so that only the deflected reference beam 38 is input to the storage media 10 at the appropriate angle and location. The angle is determined by the desired page in that particular stack. The deflected reference beam 38 will be constructively diffracted by the interference grating that was recorded with a particular underlying spatial frequency that corresponds to the deflected reference beams particular angle. This results in a reconstructed image of the original bit pattern that stored there with a reference beam with that particular angle. The diffracted reference beam 39 or reconstructed data beam then passes through the storage media 10 into a focusing system 40 which focuses the reconstructed image onto the surface of a detector array 42 of, for example, a charge-coupled device that captures the reconstructed light and dark bit patterns of the image and then convert them back to digital electronic signals for transfer to a computer. This is represented by a data output line 44.

As described hereinbelow, the page addressing deflector system 36 is operable to direct the reference beam 38 along one of two Bragg planes relative to the surface of the storage media 10. During a Write operation, data is superimposed onto the data beam or object beam and then the reference beam 38 directed at a given Bragg angle within a given Bragg plane. Therefore, an interference grating will be formed at the specific location within the holographic storage media 10 at which the reference beam and data beams interfered. Upon recreating a reference beam at the exact Bragg angle in the exact Bragg plane at which the data was stored, a reconstructed beam will be directed toward the detector 42. If the interference grating was created with a reference beam is in a different Bragg plane, the image is reconstructed off-image of the detector 42.

Figure 2A:
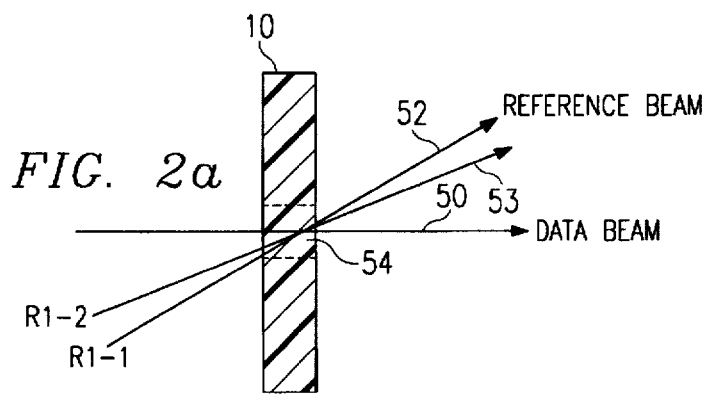
FIGS. 2a, 2b and 2c illustrate the conventional operation of multiplexing interference gratings and selectively reconstructing data from one of them in a single plane of incidence.

Referring now to FIG. 2a, there is illustrated a top view of the storage media 10 taken along a single plane of incidence (POI). As will be described herein, a plane of incidence is a plane in which both the data beam and the reference beam reside during a holographic recording operation. Thereafter, when the reference beam is again passed through the storage location 54 in the same plane of incidence and at the same Bragg angle, the reconstructed data beam will be along the same path as the original data beam.

In FIG. 2a, a data beam 50 is illustrated as passing through the storage region 54 in the storage media 10.

Additionally, two reference beams 52 and 53 are illustrated as passing through the storage media 54, this representing two separate reference beams for two separate recording operations, it being understood that only one reference beam at a time will pass through the storage region 54 to interfere with a particular data beam 50. The reference beam 52 is labeled R1-1 and the reference beam 53 is labeled R1-2, both of the reference beams 52 and 53 illustrated as being in a POI R1.

The storage media of FIG. 2a utilizes a photopolymer, which photopolymer is a material that undergoes photo-induced polymerization. These compositions have been used to form conventional holograms. These are typically fabricated from a gel based composition which is photo-reactive. When two laser beams intersect in the gel to set up an interference pattern, this causes selective polymerization within the material. These compositions typically contain a polymeric binder, a liquid ethylinically unsaturated monomer and a photoinitiator system. Typically, the layer of gelatin is spun onto a substrate such as glass to provide a thin coating of approximately 20 microns. A capping layer of material such as Mylar® is then disposed over the gelatin layer. This provides a relatively good optical surface on the upper surface of the gelatin layer, and the glass substrate provides a high quality optical surface on the bottom surface of the gelatin layer.

Figure 2B:
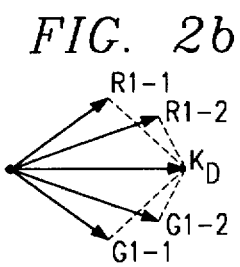

Referring now to FIG. 2b, there is illustrated the vector diagram associated with the interference pattern or grating recorded within the storage media 10. Each of the beams has a propagation vector or K-vector ($K_R$), the data beam being represented by the K-vector $K_D$, labeled "D", and the reference beams represented by the K-vector $K_{R1-1}$ and $K_{R2-1}$, being labeled R1-1 and R2-1, respectively. Whenever the data beam and one of the reference beams interfere, an interference grating is stored comprised of three dimensional dark and light patterns. These dark and light patterns can be viewed as a plurality of parallel grating planes that are spaced apart with a grating vector passing through the planes and perpendicular thereto. This grating vector (G) is represented by the following equation:

$$\vec{G} = \vec{K}_D - \vec{K}_R \quad (1)$$

There is a grating vector for each recording. These are labeled G1-1 and G1-2 corresponding to the reference beam that was used. It can be seen that a grating vector G1-1 is provided for the interference between the data beam and the reference beam R1-1 and a grating vector G1-2 is provided for the interference between the reference beam R1-2 and the data beam.

Figure 2C:
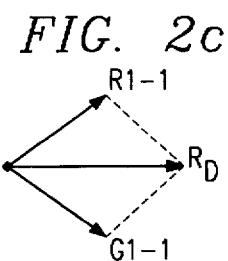

Referring now to FIG. 2c, there is illustrated a vector diagram for the data reconstruction operation. During data reconstruction, a reference beam is passed through the storage region 54 in the storage media 10. The propagation vector $K_{RD}$, labeled "RD", for the reconstructed data beam will be the sum of the reference beam vector and the grating vector as shown in Equation 1. With respect to FIG. 2b, it can be seen that the grating vector is always in the same plane as the reference beam and the data beam that formed the interference grating, this being again the plane of incidence (POI). As such, if the reference beam is in the same POI as the grating vector during a Read operation, the reconstructed data beam will also be in the same plane and this reconstructed data beam will be in the same direction as the original data beam. Therefore, if the original data beam was directed at the detector 42, the reconstructed data beam will also be directed at the detector 42.

Figure 3:
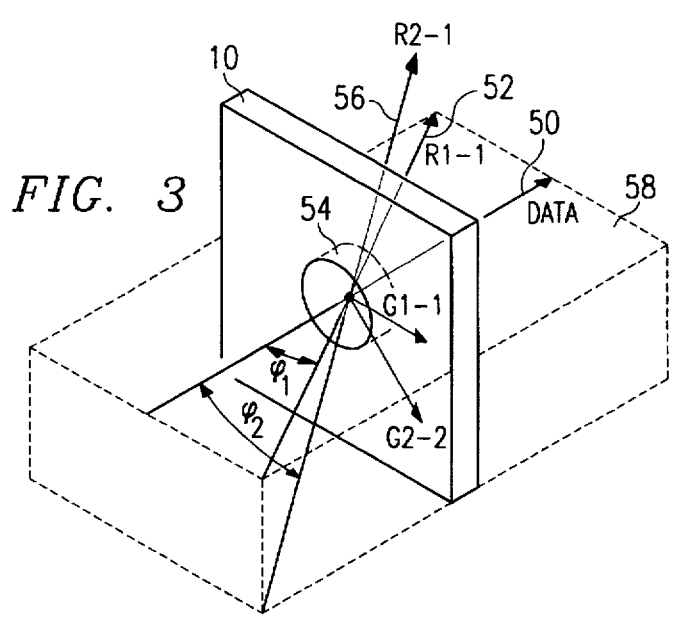
FIG. 3 illustrates the interaction between two different reference beams in two different planes of incidence with the same Bragg angle.

Referring now to FIG. 3, there is illustrated a situation wherein the data beam 50 and the reference beam 52, labeled R1-1, are disposed in a first POI 58 (R1). A second reference beam 56, labeled R2-1, is passed through the storage region 54 from a direction that is not in the plane 58. The reference beam 56 and the data beam 50 lie in a second POI R2. Each of the reference beams 52 and 56 are disposed at angles $\phi_1$ and $\phi_2$, respectively, relative to the data beam 50 within their respective POI, these being the Bragg angles. Therefore, when the reference beam 52 interferes with the data beam 50 during a recording operation at the Bragg angle $\phi_1$, an interference grating is stored having a grating vector G1-1 in the POI 58 and a Bragg angle $\phi_1$. Similarly, the interference between the reference beam 56 and the data beam 50 during a recording operation results in the formation of a grating vector G2-1 at a Bragg angle $\phi_2$ being disposed in the POI occupied by both the data beam 50 and the reference beam 56. Although not illustrated, each of the grating vectors G1-1 and G2-1 have associated therewith a Bragg angle vector within the associated POI that lies along the same direction as the reference beam that created the interference grating. When a reference beam is directed along the Bragg angle vector in one of the POIs, it will have a projection in the other POI. When this projection in the other POI has an angle relative to the data beam 50 substantially equal to the Bragg angle of the interference grating in the other POI, there will be a data reconstruction from the interference grating associated with the other POI in addition to a data reconstruction in the one POI. As will be described hereinbelow, only the reconstructed image associated with a reference beam in the same POI as the reference beam will be reconstructed along the original path of the data beam 50. The other images will be reconstructed as off-images.

Figure 4B:
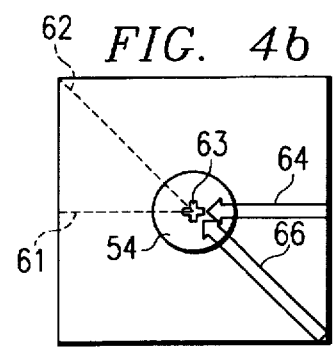
FIGS. 4a and 4b illustrate a diagrammatic view of the recording of two interference gratings in two separate planes of incidence.
Figure 4A:
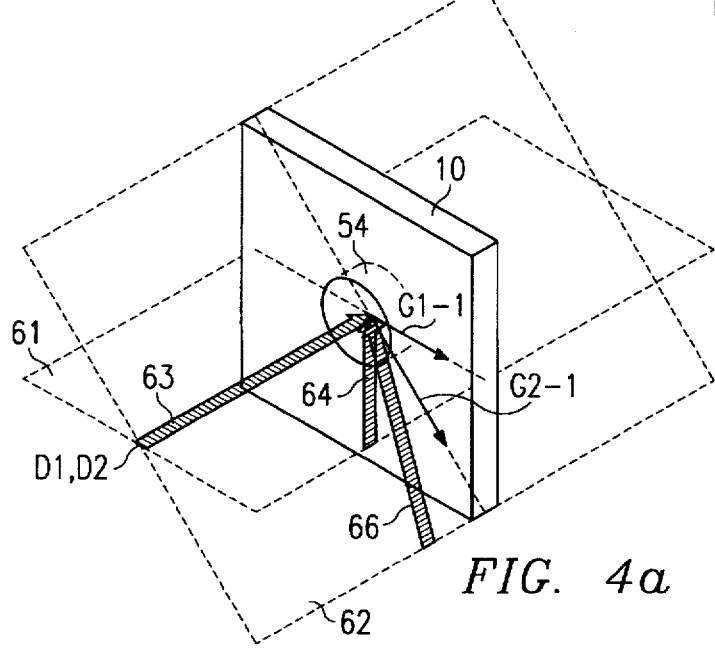

Referring now to FIGS. 4a and 4b, there is illustrated a diagrammatic view of the recording of two interference gratings in two separate POIs, a POI 61 and a POI 62. The POI 61 is oriented such that a data beam 63 and a reference beam 64 are disposed therein. The POI 62 is oriented at an angle relative to the POI 61 but having a common axis along the longitudinal length of the data beam 63, such that it "rotates" about the data beam 63, such that the two POIs have a common rotational axis. The data beam 63 is therefore in the plane 62, as well as a reference beam 66.

When the data beam 63 has data D1 superimposed thereon and the reference beam 64 is directed to intersect the data beam 63 at the surface of the media 10 at the storage location 54, an interference grating is recorded within the media 10. Thereafter, a different set of data, data D2, is superimposed on the data beam 63 and the reference beam 66 directed to intersect the data beam 63 at the media 10 in the storage location 54. This occurs at a different time than the previous recording operation with the reference beam 64, such that an interference grating is stored in the same storage location 54. The interference grating associated with the data beam 63, reference beam 64 and data D1, has a grating vector G1-1 associated therewith that is in the plane 61. Similarly, the interference grating stored as a result of the interference between the reference beam 66 and the data beam 63 with the data D2 superimposed thereon results in an interference grating having a grating vector G2-1 that is in the plane 62. FIG. 4b illustrates an end view of the schematic representation of FIG. 4a.

Referring now to FIGS. 5a and 5b, there are illustrated perspective views of the reconstruction operation for the off-image and on-image, respectively. FIG. 5a illustrates a reference beam 67 in POI 62 that is directed toward the location in media 10 in which the interference gratings associated with grating vectors G1-1 and G2-1 are stored.

The reference beam 67 illuminates the associated storage region 54 and is operable to generate a reconstructed data beam 68 of the data D1 associated with grating vector G1-1. The off-image associated with the reconstructed data beam 68 is that associated with the recording having the grating vector G1-1 associated therewith. The reference beam 67 will have a projection 69 associated therewith that is in the plane 61 and at an angle to the original data beam substantially equal to the Bragg angle of the interference grating associated with grating vector G1-1. This condition will provide a reconstructed component 70 that is a result of the combination of the projection 69 in the plane 61 and the interference grating associated with grating vector G1-1. However, there is a projection 71 of the reference beam 67 that rises out of the plane 61. This causes reconstructed data beam 68 to also rise out of the plane 61 and, therefore, the reconstructed data beam 68 will not be in the same direction as the original data beam, i.e., along the rotational axis of both of the planes 61 and 62, but will be directed at an angle rising above the POI 61.

Referring now to FIG. 5b, there is illustrated the operation wherein an on-image reconstructed data beam 72 is provided for. The reference beam 67 impinges onto the surface of the media 10 at the storage location 54 where the interference grating associated with the grating vectors G1-1 and G2-1 were recorded. Since there was an interference grating recorded in the storage location 54 having a grating vector G2-1 associated therewith, which is in the same plane as the reference beam 67, the reconstructed data beam 72 will be in the direction of the original data beam, i.e., along the rotational axis of the two planes 61 and 62, and this reconstructed data beam 72 will have associated therewith data D2 that was recorded in the interference grating associated with the grating vector G2-1.

It should be understood that both the off-image reconstructed data beam 68 and the on-image reconstructed data beam 78 are generated at the same time, although illustrated as being separately generated, due to the fact that there were two interference gratings G1-1 and G2-1 stored in the media 10 in two different POIs, wherein the reference beam in one POI has a projection in the other POI substantially equal to the Bragg angle of the interference pattern in that POI. However, the off-image reconstructed data beam 68 exits at a different angle than that associated with the original data beam. This is illustrated in FIG. 5c. FIG. 5d illustrates an end view of the schematic representation of FIG. 5c.

Figure 6:
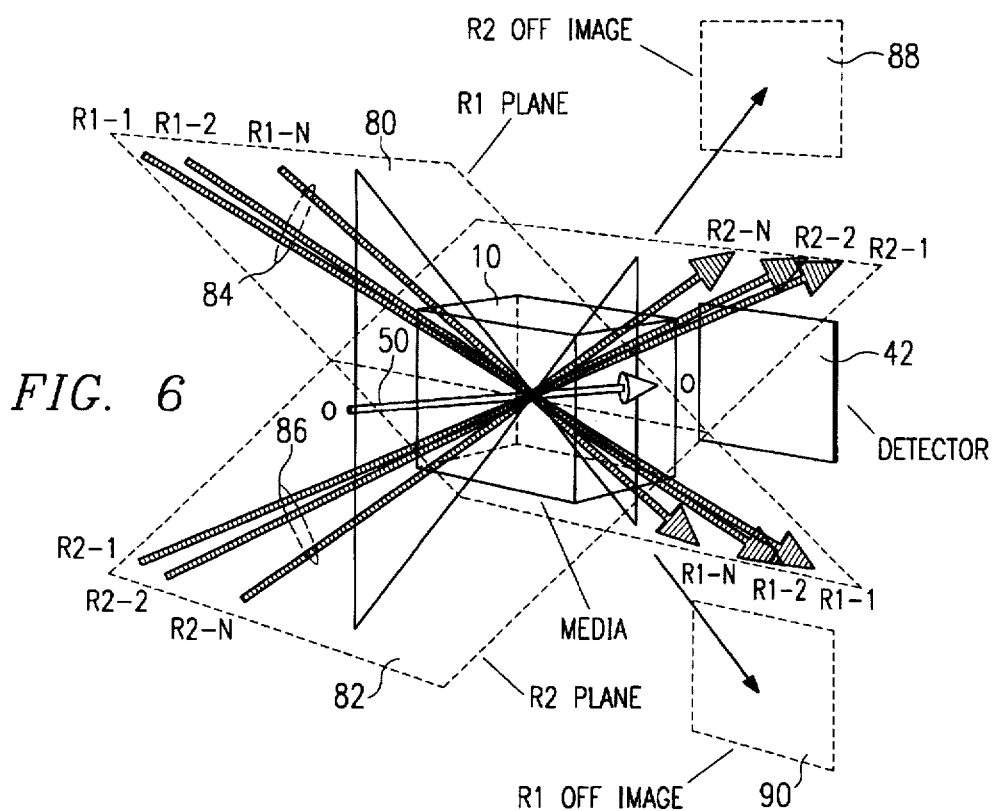
FIG. 6 illustrates a perspective view of multiple reference beams in multiple planes of incidence.

Referring now to FIG. 6, there is illustrated one configuration of the present invention. In FIG. 6, reference beams are disposed in planes 80 and 82, these not being POIs. Reference beams 84 are varied across a plurality of angles within the plane 80 and intersecting at the storage region 54 such that they will interfere with the data beam 50 during a Write operation and will result in reconstruction during a subsequent Read operation. Similarly, the reference beams 86 are disposed in plane 82 over a plurality of angles and operate similar to the reference beams 84 in plane 80. The reference beams in plane 84 are labeled R1-1, R1-2 through R1-n. The reference beams in plane 82 are labeled R2-1, R2-2 through R2-n.

Each of the reference beams 84 and each of the reference beams 86 has associated therewith a grating vector that lies in the POI that is formed between the specific one of the reference beams 84 or 86 and the data beam 50. When reconstructing data during a Read operation with one of the reference beams 84 or 86, the reconstructed data beam lies in the POI of the one reference beam. The reconstructed data is that associated with the grating pattern having its associated grating vector in the POI of the one reference beam, which is the POI in which the original reference beam and data beam were disposed during the record operation for that grating pattern. Of all the grating vectors for all the superimposed recordings that can be reconstructed with the one reference beam, only one will lie in this POI. Only the grating vector in the POI associated with one of the reference beams 84 or one of the reference beams 86 during the reconstruction operation will result in an image that lies on the detector 42. The reference beam that resulted in the on-image reconstructed data beam will have a component that will project into the other POI, and substantially equal to the Bragg criteria for one of the recordings associated with that POI, i.e., it will be at the same Bragg angle as that of one of the recordings in that POI. This will result in reconstruction of the data associated with that recording, but it will be directed "off-image." For example, when the reference beam 84, labeled R1-1, is passed through the storage media 10 and interferes with the data beam 50 in the storage region 54, an interference grating with a grating vector in that POI will be created. When data is reconstructed with the reference beam 84, labeled R1-1, the data associated with the interference grating having the associated grating vector in the POI 80 will be reconstructed on the detector 42. However, the reference beam R1-1 will have a projection into the POI 82 that meets the Bragg criteria of the corresponding interference pattern associated with reference beam R2-1. A reconstructed data beam corresponding to the information in an interference grating originally associated with reference beam R2-1 will be reconstructed in an off-image site 90 which is outside the detector 42. Similarly, each of the subsequent reference beams 84 will also result in a reconstructed data beam on the surface of the detector 42, and an off-image reconstructed data beam on the off-image site 90. Each of the images in the off-image site 90 are associated with the originally-stored images associated with the reference beams 86. In a similar manner, whenever the reference beams 86 are passed through the storage region 54 in the storage media 10 during a data reconstruction operation, they will have a projection into the POI 80, resulting in an on-image reconstructed data beam that impinges on the surface of detector 42 and an off-image reconstructed data beam that falls on an off-image site 88. These images correspond to the data that was originally stored in the storage media at the same Bragg angle as the projection relative to the data beam 50 associated with the reference beams 84.

Figure 6A:
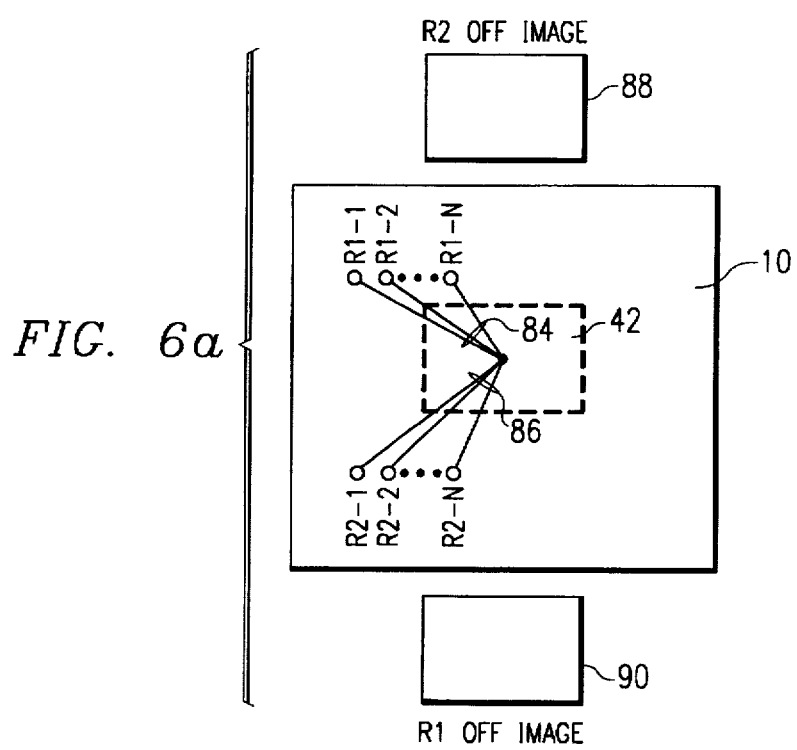
FIG. 6a illustrates an end view of the structure of FIG. 4.

Referring now to FIG. 6a, there is illustrated an end view of the storage media 10 illustrating the arrangement of the reference beams 84 and 86. It can be seen that the reference beams 84 are disposed in a line parallel to that of the reference beams 86. In this manner, all of the off-image reconstructed data beams will be reconstructed in a single area, in the off-image site 90. Similarly, all of the off-image reconstructed data beams associated with the reference beams 86 will fall in the off-image site 88. Both of the image sites 88 and 90 will be outside the area of the detector 42. Of course, it should be understood that the larger the number of POIs utilized for a single Bragg angle, the lower the energy of the subsequently reconstructed data beams. For N POIs, the resultant energy of the reconstructed data beam will be 1/N of the associated energy of a reconstructed data beam for a single POI.

Figure 7:
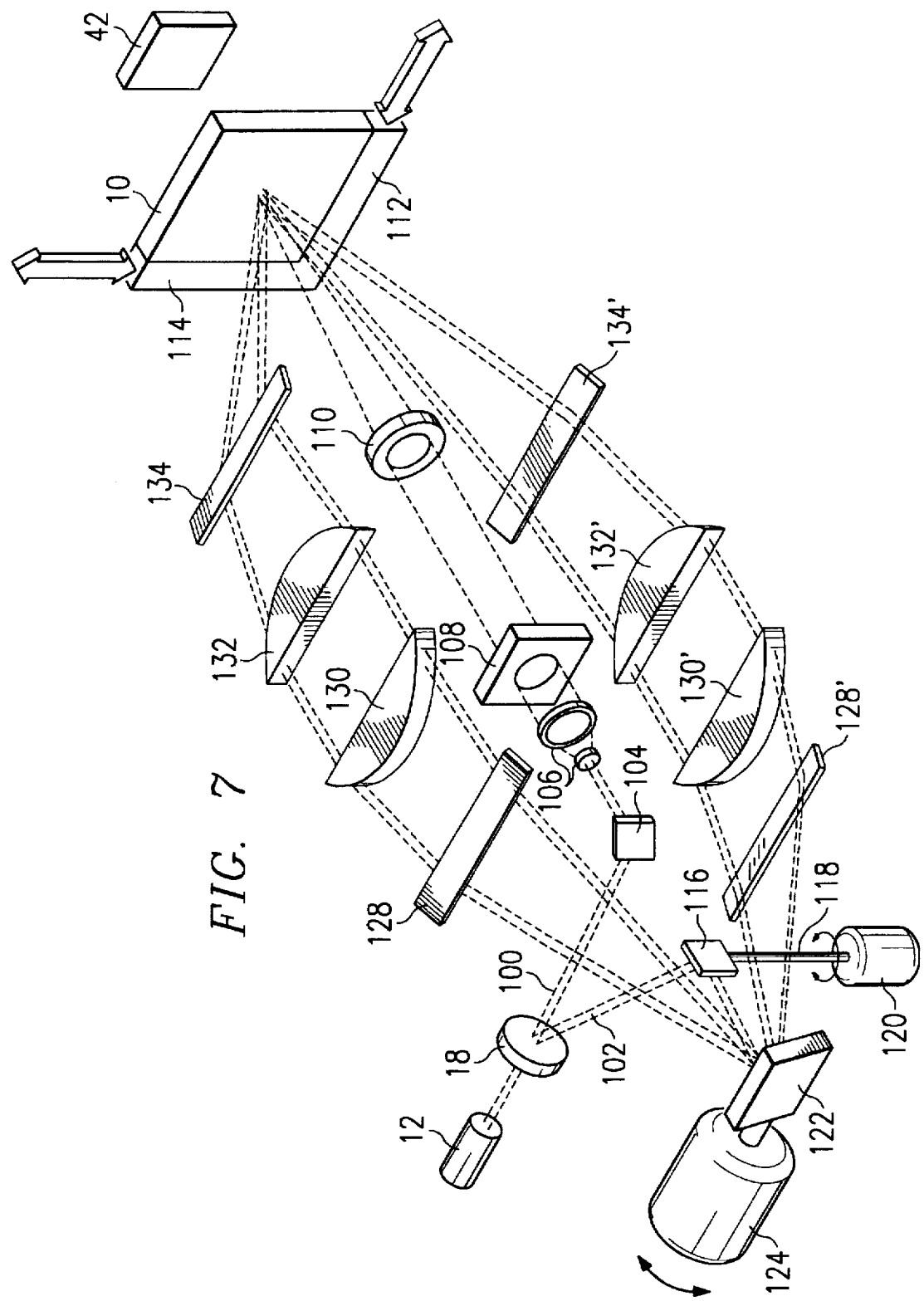
FIG. 7 illustrates a perspective view of the preferred embodiment for the system of FIG. 1.

Referring now to FIG. 7, there is illustrated a perspective view of the preferred embodiment for the system of FIG. 1. The laser 12 is operable to generate a coherent light beam and direct it toward the beam splitter 18. The beam splitter 18 divides the beam up into a data beam 100 (prior to encoding data thereon) and a reference beam 102. The data beam 100 is directed toward a mirror 104 which deflects the data beam 100 at a predetermined angle to a beam expander and collimator 106. The beam expander and collimator 106 is operable to expand the data beam into a collimated beam for input to a Spatial Light Modulator (SLM) 108. The SLM 108 superimposes dam onto the data beam and then directs it toward a focusing system 110. The focusing system 110 focuses the data beam onto the surface of the media 10 at a predetermined storage location. The storage location is determined by mechanically moving about two axis the media 10. This is accomplished with a motive mechanism 112 for movement in the x-direction and a motive mechanism 114 for movement in the y-direction.

The reference beam 102 is directed toward a movable mirror 116 which is connected to a rotating shaft 118, the shaft 118 rotated by a stepping motor 120. A mirror 116 is operable to direct the beam 102 toward a mirror 122 at a predetermined angle with respect to the surface thereof, this angle varied by the motor 120. The mirror 122 has two positions, a top position and a bottom position which are determined by a stepping motor 124. In each position, a lens/directing array is provided for redirecting each of the beams toward the storage location on the media 10 which, in a recording operation, will intersect with the data beam. Each of the lens/directing arrays has associated therewith a first mirror 128 for receiving the deflected beam from the mirror 122 and deflecting it toward a first lens 130 that directs the reference beam along a parallel path such that all reference beams will be parallel, regardless of the angle that they have relative to the surface of the mirror 122. The parallel reference beams are directed toward a second mirror 132, which is operable to direct the reference beams onto the storage location on the media 10 after deflection by a mirror 134. The other half of the lens/directing array, the bottom portion, has a similar arrangement with mirrors 128' and 134' and lenses 130' and 132'.

In operation, the laser 12 is operable to generate the coherent light beam which, in a recording mode, has data superimposed onto the data beam and directed toward the surface of the media 10, and the reference beam 102 directed at one of a plurality of angles at the surface of the mirror 122 to provide a single reference beam for interference with the data beam. In the data reconstruction mode, the data beam is inhibited from impinging upon the surface of the media 10 and only the reference beam is directed thereto. This results in a reconstructed on-image being directed toward the detector 42 and a reconstructed off-image which misses the detector 42.

In summary, there has been provided a system for storing multiple pages which can be discriminated at a given Bragg angle within a given storage region. Each of the recordings of a given Bragg angle are recorded with a reference beam in a different POI. During the reconstruction of the data, the reconstructed data associated with the reference beam and its POI will be reconstructed on a detector. However, for data stored in a different POI, but with a Bragg angle at substantially the same angle as the projection of the reference beam in the different POI, the image will be reconstructed off-image of detector.

Although preferred embodiments have been described in detail, it should be understood that various changes, substitutions and alterations can be made therein without departing from the spirit and scope of the invention as defined by the appended claims.

What is claimed is:

1. A holographic recording system, comprising:

a holographic storage media having storage regions defined therein;

a recording system for storing holographic recordings in select ones of said storage regions as interference gratings, at least one of said storage regions having a first holographic recording stored in a first plane of incidence (POI) with a first Bragg angle and a second holographic recording stored in a second POI with a second Bragg angle, which second POI is not coplanar with said first POI, said POI being the plane in which a data beam and a reference beam reside when creating a holographic recording in said storage media, said data beam for each of said first and second POIs being along a common path, with the projected component of a reference beam at the first Bragg angle in said first POI into said second POI, with the angle between said projected component and said common data path in said second POI comprising said second Bragg angle, which will cause reconstruction of said second holographic recording that was recorded in said second POI with the reference beam in said second POI at said second Bragg angle; and a reconstruction system for selectively extracting the information stored in each of said first and second holographic recordings from said storage media with a single reference beam from a single source and operable to distinguish between the extracted information from said first and second holographic recordings stored in said at least one storage region.

2. The holographic recording system of claim 1, wherein said recording system comprises:

an optics system for generating a data beam having data encoded therein and a reference beam;

a first directing system for directing said data beam onto the surface of said storage media in one of said recording regions; and a second directing system for directing said reference beam at the surface of said storage media to interfere with said data beam, said second directing system operable to direct said reference beam at a select Bragg angle relative to said data beam and in one of at least two POIs relative to said data beam.

3. The holographic recording system of claim 1, wherein said reconstruction system comprises:

an optics system for generating a reference beam;

a directing system for directing said reference beam at the surface of said storage media at a select one of said storage regions, said directing system operable to direct said reference beam at a select Bragg angle and in either one of said first or second POIs with a projection into the other of said first and second POIs to generate an on-image reconstructed data beam for holographic recordings stored in said select storage region associated with said one POI and said Bragg angle, and an off-image reconstructed data beam for holographic recordings stored in said storage media in the other of said first and second POIs at the Bragg angle of said projection; and a detector disposed on the opposite side of said holographic storage media in the path of said on-image reconstructed data beam with said off-image reconstructed data beam not impinging upon said detector.

4. The holographic recording system of claim 1, wherein said holographic storage media comprises a holographic storage media comprised of a photopolymer material with a thickness less than the width of the storage region.

5. A holographic reconstruction system for reconstructing and detecting data stored in holographic recordings in a select storage region in a holographic storage media in at least first and second noncoplanar planes of incidence (POI), wherein a single reference beam can cause reconstruction of data from more than one recording in the first and second POIs, the POI being the plane in which a data beam and a reference beam reside when creating a holographic recording in said storage media, comprising:

a reference beam;

a direction system for directing said reference beam to the surface of the holographic storage media within the storage region in either the first POI or the second POI and at substantially the same Bragg angle at which the holographic recording was recorded in the associated one of the first and second POIs such that an on-image reconstructed data beam is generated for the holographic recording stored in association within the associated one of the first and second POIs, and an off-image reconstructed data beam is generated representing the data stored in the storage region that was associated with a reference beam at the Bragg angle of the projection of said reference beam in the other of the first and second POIs; and a detector for selecting only the on-image reconstructed data beam and detecting the data therein.

6. The recording system of claim 5, wherein said detector comprises a fixed detector disposed at a predetermined location on the opposite side of the holographic storage media wherein the first and second POIs are selected such that all of the off-image reconstructed data beams associated with other POIs are outside of the surface of said fixed detector.

* * * * *